United States Patent Office 3,458,282
Patented July 29, 1969

3,458,282
PROCESS FOR PURIFYING PHOSPHORIC ACID
Ernest L. Koerner, Jr., Oklahoma City, Okla., and Elerington Saunders, Marblehead, Mass., assignors to Monsanto Company, St. Louis, Mo., a corporation of Delaware
No Drawing. Continuation of application Ser. No. 260,029, Feb. 20, 1963. This application Aug. 16, 1967, Ser. No. 660,900
The portion of the term of the patent subsequent to Feb. 6, 1985, has been disclaimed
Int. Cl. C01b 25/18; B01d 11/04
U.S. Cl. 23—165      10 Claims

ABSTRACT OF THE DISCLOSURE

A method is described for purifying phosphoric acid containing anionic fluoride impurities and/or anionic sulfate impurities by contacting the acid with a water insoluble extractant phase comprised of an amine compound or a quaternary ammonium compound dissolved in an organic diluent, the extractant phase being used in an amount sufficient to extract the anionic impurities and from a water-immiscible extractant phase and separating the extractant phase and the phosphoric acid.

This application is a continuation of application Ser. No. 260,029, filed Feb. 20, 1963, now U.S. Patent No. 3,367,749.

This invention pertains to purifying phosphoric acid, and, more particularly, to purifying phosphoric acid by novel extraction methods.

It is well known that phosphoric acid produced by the widely used commercial wet method requires some degree of purification especially when intended for use in food chemicals or pure chemicals. In general, silicon, calcium, arsenic, iron, fluorine, aluminum, chromium, vanadium and lead compounds are some of the impurities which often require separation to some degree from the wet phosphoric acid prior to its intended use. Heretofore, extraction methods employed for the separation of phosphoric acid from the impurities have usually been termed solvent extraction methods and have, in general, been directed to using a substantially water-immiscible solvent in which phosphoric acid exhibits a greater solubility than in the aqueous phase, thereby purifying the wet phosphoric acid. The methods of the prior art have not, in general, been selective to any degree as to the various impurities which are not extracted as well as the various impurities which are dissolved in the extracted acid. As can be appreciated, therefore, novel extractant methods which are capable of the selective extraction of either phosphoric acid from certain impurities in the wet phosphoric acid or the extraciton of certain impurities from the wet phosphoric acid would represent a highly versatile and adaptable method of purifying wet phosphoric acid.

It is, therefore, an object of this invention to provide an improved process for purifying phosphoric acid.

It is a further object of this invention to provide an improved process for the selective extraction of certain impurities from phosphoric acid, as well as, the selective extraction of phosphoric acid from other impurities.

It is a still further object of this invention to provide an improved process for the selective extraction of certain anionic impurities, such as, fluoride and sulfate impurities, from phosphoric acid.

It is another object of this invention to provide an improved process for the selective extraction of phosphoric acid from phosphoric acid containnng cation or metallic impurities.

It is a still further object to provide an improved process for purifying phosphoric acid to the degree of purification which would enable its use in food chemicals or pure chemicals.

These and other objects will become apparent from the detailed description hereinafter.

This invention, in general, pertains to purifying phosphoric acid by novel extraction methods utilizing an amnie and/or an amine salt preferably dissolved in an organic diluent as an extractant phase to remove either certain impurities from phosphoric acid and/or to remove phosphoric acid from the phosphoric acid phase as will be more fully discussed hereinafter.

Although the following description is primarily concerned with purifying wet phosphoric acid it should be noted that the instant invention is capable of purifying, in general, any impure phosphoric acid, however, it is especially adaptable to purifying wet phosphoric acid. As used herein "wet" phosphoric acid means phosphoric acid produced by the wet method which essentially entails the acidulation of phosphate rock by the use of acids, such as, sulfuric acid. The phosphate rock raw material can, of course, vary depending on, inter alia, the source from which it is mined and is usually obtained from such deposits as those located in Florida and the western states, such as Idaho. Although the extractant methods of the present invention do not appear to be dependent on the concentration of the wet phosphoric acid, it is preferred, however, that the concentration be within the range of about 1 to about 90 weight percentage of equivalent $H_3PO_4$.

The amines suitable for use in the present invention are, in general, water-insoluble and/or capable of forming desired water-insoluble salts. In general, amine compounds containing a terminal polar nitrogen containing group and at least 2 hydrophobic substituent groups, such as those compounds derived from fatty acids of varying molecular weights and different degrees of saturation, are suitable for use. The suitable amines may be secondary or tertiary amines as well as quaternary ammonium compounds. In particular, secondary and tertiary aliphatic amines having two substituent groups, each containing about 7 to about 15 carbon atoms, and including branch chain structures as well as straight chain structures, are quite suitable for use in the present invention. Mixtures of amines are suitable when containing to a predominant extent the foregoing structures. It should be noted that for tertiary aliphatic amines the third subsituent group may contain any number of carbon atoms but preferably should not contain over about 15 carbon atoms. Further, the OH, COOH, $OCH_3$, halogen, $NO_2$ and $SO_3$ substituted derivatives of the substituent groups may, in most cases, be used, as well as the substituent groups containing alkoxy radicals, as long as at least two of the groups are hydrophobic, thus rendering the compound water-insoluble to the desired degree. The primary aliphatic amines are less suitable because of their tendency to precipitate as the amine salts when in contact with wet phosphoric acid. The secondary or tertiary aliphatic amines containing less than about 7 carbon atoms on each of at least two substituent groups exhibit the undesirable tendency to be water-soluble. The secondary or tertiary aliphatic amines containing more than about 15 carbon atoms on each of at least two substituent groups exhibit the undesirable tendency to form salts which are relatively insoluble in the extractant phase. Aromatic amines, whether primary, secondary or tertiary, exhibit undesirable tendencies, such as either poor extractant properties, poor water-insoluble salt forming properties or poor salt solubilities in the extractant phase.

All of the immediately foregoing relating to the amines is, in general, applicable to the amine salts which are suitable for use in the instant invention. In addition, the amine salts suitable for use in the present invention can, in general, be formed from many organic and inorganic acids and preferably those acids which are stronger than phosphoric acid, i.e., having a Ka greater than about $8\times10^{-3}$, such as sulfuric acid, hydrochloric acid and the like. Ionization constant of an acid (Ka) as used herein refers to the dissociation of an acidic electrolyte at room temperature, i.e., about 25° C., and is equal to the product of the activities of each of the ions produced by the dissociation (if more than one ion of a given kind is produced, its activity is raised to the corresponding power) divided by the activity of the undissociated molecules with the activities assumed to be in their standard states at infinite dilution.

It should also be noted that quaternary ammonium salts as well as quaternary ammonium bases are suitable for use as an extractant in the present invention. In general, all of the foregoing relating to the tertiary amine and amine salts is applicable to quaternary ammonium salts and bases. The fourth substituent aliphatic group attached to the nitrogen may contain any number of carbon atoms but preferably should not contain over about 15 carbon atoms.

The term "water-insoluble" as used herein with respect to the amines and/or amine salts including the quaternary ammonium compounds, does not necessarily require complete insolubility. It merely requires that the material be sufficiently immiscible with the wet phosphoric acid phase to allow physical separation of the liquids into two distinct phases.

The preferred amines useful as extractants are long chain hydrocarbyl amines of the following formula

wherein $R_1$ and $R_2$ are members selected from the class consisting of saturated and ethylenically unsaturated aliphatic hydrocarbyl groups containing from about 7 to about 15 carbon atoms and $R_3$ is a member selected from the class consisting of hydrogen and saturated and ethylenically unsaturated aliphatic hydrocarbyl groups containing from 1 to about 18 carbon atoms.

The preferred amine salts useful as extractants are long chain hydrocarbyl amine salts of the following formula

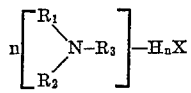

wherein $R_1$ and $R_2$ are members selected from the class consisting of saturated and ethylenically unsaturated aliphatic hydrocarbyl groups containing from about 7 to about 15 carbon atoms, $R_3$ is a member selected from the class consisting of hydrogen, saturated and ethylenically unsaturated aliphatic hydrocarbyl groups containing from 1 to about 18 carbon atoms, $n$ is an integer from 1 to 3 inclusive and X is a member selected from the class consisting of anions of mineral acids having a Ka greater than about $8\times10^{-3}$.

The preferred quaternary ammonium compounds useful as extractants are long chain hydrocarbyl quaternary ammonium compounds of the following formula

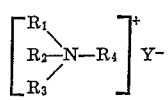

wherein $R_1$ and $R_2$ are members selected from the class consisting of saturated and ethylenically unsaturated aliphatic hydrocarbyl groups containing from about 7 to about 15 carbon atoms, $R_3$ is a member selected from the class consisting of saturated and ethylenically unsaturated aliphatic hydrocarbyl groups from 1 to about 18 carbon atoms, $R_4$ is a member selected from the class consisting of saturated and ethylenically unsaturated aliphatic hydrocarbyl groups from 1 to about 15 carbon atoms and Y is a member selected from the class consisting of anions of mineral acids having a Ka greater than about $8\times10^{-3}$.

The following long chain hydrocarbyl amines are representative of suitable extractants for use in the present invention.

di-n-decylamine,

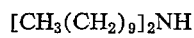

di-n-decylammonium sulfate,

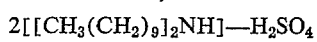

tri-n-octylamine,

tri-n-octylammonium chloride,

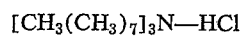

methyldioctylamine,

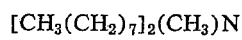

dimethyldioctyl ammonium chloride,

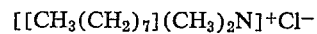

dimethyldioctyl ammonium hydroxide,

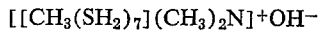

di-n-dodecylamine,

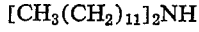

tri-n-dodecylamine,

bis-methyltridodecyl ammonium sulfate,

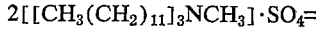

dimethyldiododecyl ammonium chloride,

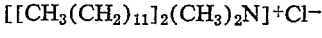

dimethyldidodecyl ammonium hydroxide,

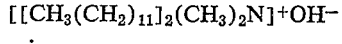

tricaprylyl amine,

where R is a mixture of $C_8H_{17}$ and $C_{10}H_{24}$ but predominantly $C_8H_{17}$ tricaprylyl amine sulfate,

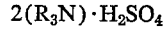

where R is a mixture of $C_8H_{17}$ and $C_{10}H_{21}$ but predominantly $C_8H_{17}$ tri iso-octyl amine,

where $C_8H_{17}$ groups are comprised of mixed isomers

N,N-didodecenyl-N-n-butyl amine,

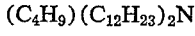

N-dodecenyl-N-trialkylmethyl amine,

where $R_1+R_2+R_3$ squal $C_{11}H_{23}$ to $C_{14}H_{29}$

N,N-didodecenyl-N-n-butyl amine,

where $R_1+R_2+R_3$ equal $C_{11}H_{23}$ to $C_{14}H_{29}$ tricoco amine, $R_3N$ where R is a mixture of:

| | Percent |
|---|---|
| $C_8H_{17}$ to $C_{10}H_{21}$ | 15 |
| $C_{12}H_{25}$ | 48 |
| $C_{14}H_{29}$ | 18 |
| $C_{16}H_{33}$ | 9 |
| $C_{18}H_{37}$ (stearyl-oleyl) | 10 | trilauryl amine, $R_3N$ where R is a mixture of:

| | Percent |
|---|---|
| $C_{12}H_{26}$ | 88 |
| $C_{14}H_{29}$ isomers | 10 |
| $C_{10}H_{21}$ | 2 |

It should be noted that the amines which are suitable for use in the instant invention are believed to function by forming amine salts with anions or anionic complexes, however, it has been found that other mechanisms probably operate since amounts of anionic materials in excess of that theoretically possible by such a salt forming mechanism can be extracted. It should further be noted that when using the salt form of the amine its ability to extract should predictably be based on a salt exchange mechanism, for example, the amine sulfate salt forming the amine phosphate salt. However, it has been found that a mechanism other than a salt exchange mechanism and believed to be a solubility mechanism appears to operate. This discovery is quite unexpected and highly significant in that it permits a high degree of selection in both the extraction process and the removal process. For example, in some cases, the free amines will extract certain impurities along with phosphoric acid and in such cases it is possible to use an amine salt and selectively extract phosphoric acid without extracting the impurities. In addition, it is possible, in general, to remove the extracted phosphoric acid from an amine salt in an easier and more efficient manner than when removing the extracted phosphoric acid from a free amine extractant. Irrespective of the mechanistic theory of operation it should be noted that the amines and/or salts have the outstanding ability to effectively extract on a selective basis.

Although the amines and/or amine salts are capable of extracting when in the undiluted liquid form it is preferred that they be utilized in conjunction with an organic diluent for greater ease in handling and extracting control. In general, organic diluents which are suitable for use in the present invention are organic solvents in which the aimnes and/or amine salts are quite soluble and, in addition, are substatially water insoluble. A wide range of organic solvents are effective including kerosene, mineral spirits, naphtha, benzene, xylene, toluene, nitrobenzene, carbon tetrachloride, chloroform, trichloroethylene and the like.

In some instances it is highly desirable to add minor amonts of suitable additives to increase the solubility of the amine and/or amine salts in certain organic solvents. Additives which have been especially effective as solubilizing agents are, in general, water-insoluble alcohols which are soluble in the organic diluent and preferably are monohydric higher aliphatic alcohols containing about 6 to about 20 carbon atoms; especially preferred are the primary alcohols containing not more than 15 carbon atoms. For example, tricaprylyl amine sulfate, about 10% by total volume, is rendered more soluble in kerosene by the addition of about 5% by total volume of n-decyl alcohol as an additive. Suitable alcohols include 1-hexanol, 4-methyl-2-pentanol, 2-ethyl-1-butanol, 2-heptanol, 1-octanol, 2-octanol, 5-ethyl-2-nonanol, 1-dodecanol, 1-tetradecanol and the like.

The extraction processes, as well as the back-extractions or removal processes, may be carried out in batches in which case it may be necessary to repeat the extraction until the desired advantageous degree of extraction is reached. However, the processes may be carried out in a continuous operation, with counter-current contact of the aqueous or wet phosphoric acid phase with the extractant phase, or in any other continuous manner.

The impurities which have been extracted into the extractant phase can, in general, be removed from this phase by methods which include back-extracting with water or any suitable aqueous basic solution when using the free amine as the extractant; and back-extracting with water, a suitable aqueous acidic solution or a suitable basic solution when using the amine salt as the extractant. When using such procedures it is usually possible to regenerate the extractant phase for reuse which is a distinct advantage.

The phosphoric acid which has been extracted into the extractant phase by either an amine or an amine salt can, in general, be removed from this phase by many different methods which include back-extracting with water, a suitable aqueous acidic solution or a suitable aqueous basic solution. Again it is usually possible when using such procedures to regenerate the extractant phase for reuse.

The amounts of aqueous solvents, i.e., water, aqueous basic solutions or aqueous acidic solutions, necessary for the back-extractions or removal processes vary, inter alia, on the extractant phase to be used, the aqueous solvent to be used, and the equilibrium distribution between the extractant phase and the aqueous solvent phase. The preferred amounts can be readily determined by conducting equilibrium distribution tests on the extractant phase and the aqueous solvent to be used in order to determine the degree of back-extraction or removal desired. In general, when using an aqueous basic solution, the pH of the resulting aqueous phase containing the back-extracted material should be below about 7.

Other methods which can be used to remove the extracted material from the extractant phase includes vaporizing off the organic diluent and treating the remaining material with an aqueous solvent or using a gas, such as anhydrous ammonia, and bubbling this through the extractant phase to precipitate the extractant material as for example, ammonium phosphates, such as mono ammonium hydrogen phosphate or diammonium hydrogen phosphate. In either case it is usually possible to regenerate the amine extractant for reuse.

One method for the purification of wet phosphoric acid comprises selectively extracting certain impurities from the wet phosphoric acid.

By the use of a suitable amine and/or amine salt dissolved in an organic diluent certain impurities such as fluoride and sulfate impurities can be selectively extracted from the wet phosphoric acid. In many instances, the amine and/or amine salt may be used in the undiluted liquid form, as the extractant phase, however, it is usually more advantageous to dissolve the amine and/or amine salt in an organic diluent. In general, any proportion of the amine and/or amine salt to the organic diluent may be used, however, relatively high proportions on a volume basis of the amine and/or amine salt to the organic diluent results in a relatively viscous extractant phase which is difficult to use for extraction while relatively low proportions on a volume basis results in the necessity for using an excess of organic diluent. In most instances amounts of the amines and/or amine salts which are particularly well suited for use in the organic diluent are between about 1% and 80% by volume. In general, the amount of the extractant phase necessary to be contacted with the wet phosphoric acid is dependent on the amount of impurities present in the acid which are to be removed, as well as the equilibrium distribution between the impurities in the aqueous phase and the impurities in the extractant phase. In many instances if an excess of the extractant phase is used, appreciable quantities of phosphoric acid will also be extracted. Because the amines as well as the amine salts vary in the degree of extraction as well as being influenced by the particular organic diluent used it should be noted that preferably only amounts of the extractant phase which are sufficient to remove the impurities should be used. The preferred amounts can be readily determined by conducting equilibrium distribution tests on the particular wet phosphoric acid as well as the particular extractant phase to be used in order to determine the degree of extraction which is desired.

Another method for purifying phosphoric acid comprises extracting phosphoric acid from impurities, such as, metallic or cation impurities.

By the use of an amine salt dissolved in an organic diluent, phosphoric acid can be extracted from metallic or cation impurities in wet phosphoric acid. In many instances, the amine salt may be used in the undiluted liquid form, however, it is usually more advantageous to dissolve the amine salt in an organic diluent. In general, any proportion of the amine salt to organic diluent may be used, however, relatively high proportions on a volume basis of the amine salt to organic diluent results in a relatively viscous extractant phase which is difficult to use for extraction while relatively low proportions on a volume basis results in the necessity for using an excess of the organic diluent. In most instances, amounts of the amine salts which are particularly well suited for use in the organic diluent are between about 1% and 80% by volume. In general, the amount of extractant phase necessary to be contacted with the wet phosphoric acid is dependent on the concentration of the wet phosphoric acid, as well as the equilibrium distribution between the phosphoric acid in the aqueous phase and the phosphoric acid in the extractant phase. Because the amines vary in degree of extraction as well as being influenced by the particular organic diluent used it should be noted that preferably only amounts of the extractant phase which are sufficient to remove the phosphoric acid should be used. The preferred amounts can be readily determined by conducting equilibrium distribution tests on the particular wet phosphoric acid as well as the particular extractant phase to be used in order to determine the degree of extraction which is desired. It has been noted that in this case an amine salt is used in the extractant phase. In most instances any of the amine salts previously described can be used, however, the amine sulfate salt has been found to be particularly well suited. The amine salts are particularly well suited for use as extractants because it has been found that they are effective in preferentially extracting phosphoric acid over cation impurities, particularly iron, in the wet phosphoric acid.

A modification of the immediately preceding purification of wet phosphoric acid by extracting phosphoric acid from impurities, such as, metallic or cation impurities, can be carried out using the free amine in the organic diluent rather than the amine salt. Here again it should be noted that the free amine in the undiluted liquid form can be used as the extractant, although it is more advantageous to dissolve the free amine in an organic diluent. This is particularly effective where the wet phosphoric acid has been previously treated to remove iron impurities such as described in U.S. Patent 2,955,918, or where iron impurities are not a problem in the use of the purified phosphoric acid or the salts thereof.

As can be appreciated, a process for the production of substantially pure phosphoric acid or the salts thereof can be carried out by the utilization of the foregoing methods. A typical process can entail first removing, if necessary, organic impurities by filtration through activated charcoal or other suitable means. The organic purified wet phosphoric acid can then be further purified by removing such impurities as the fluoride and sulfate impurities by using a suitable amount of an extractant phase of an amine dissolved in an organic diluent. The extractant phase can then be treated with water to remove the impurities and regenerate the amine for re-use. The fluoride and sulfate free wet phosphoric acid can be further purified by using a suitable amount of an amine sulfate salt dissolved in an organic diluent as an extractant phase which can extract phosphoric acid from cation or metallic impurities. The phosphoric acid can be removed from the extractant phase by water thereby freeing the extractant phase for re-use. The resulting substantially pure phosphoric acid can be further purified with respect to organic impurities by filtration through activated charcoal or other suitable means and can be concentrated by such means as evaporation. Or, if it is advantageous to do so, the fluoride and sulfate free wet phosphoric acid can be further purified by removing iron impurities, if necessary, and then extracted with a suitable amount of a free amine dissolved in an organic diluent as the extractant phase. With such a modification, the phosphoric acid can be removed from the extractant phase by a suitable amount of an aqueous basic solution to form the desired phosphate salts. Because the instant invention pertains to selective method of extraction as well as selective methods of removal it is, of course, possible to modify or vary each step of the process to achieve operational economies, desired products and other advantages and, therefore, the foregoing has been set forth for illustrative purposes only and is in no way intended to be restrictive of the present inventive concepts.

As being illustrative of the present invention the following is presented in order to further illustrate a typical method for the production of substantially pure phosphoric acid.

The following Table 1 is a stage-wise analyses of a five stage counter-current extraction for the removal of sulfate and fluoride impurities from a commercial wet phosphoric acid, analyzed as feed acid in Table 2, to give a partially purified acid, analyzed as fluoride and sulfate removed acid in Table 2. The extractant phase is comprised of about 10% by volume of tricaprylylamine in a light aromatic petroleum fraction.

TABLE 1

| | Equilibrium aqueous phase | | | | Equilibrium organic phase | | | |
|---|---|---|---|---|---|---|---|---|
| | Vol., mls. | Conc. (g./l.) | | | Vol., mls. | Conc. (g./l.) | | |
| | | $H_3PO_4$ | $SO_4$ | F | | $H_3PO_4$ | $SO_4$ | F |
| Feed acid | 20.0 | 529.9 | 51.0 | 18.5 | | | | |
| 1 | 20.4 | 552.8 | 41.5 | 18.0 | 102.0 | 9.8 | 9.86 | 3.50 |
| 2 | 21.0 | 603.7 | 21.7 | 14.5 | 102.4 | 16.4 | 8.12 | 3.46 |
| 3 | 21.2 | 626.5 | 4.42 | 3.89 | 103.0 | 29.9 | 4.29 | 2.84 |
| 4 | 21.6 | 628.1 | 1.07 | 2.22 | 103.2 | 35.7 | .77 | .676 |
| 5 | 18.0 | 533.2 | .79 | .73 | 103.6 | 38.3 | .086 | .332 |

TABLE 2

| Constituent | Feed acid analysis (percent wt.) | Fluoride and sulfate removed acid analysis (percent wt.) |
|---|---|---|
| $H_3PO_4$ | 40.08 | 39.87 |
| $SO_4$ | 3.86 | .062 |
| F | 1.40 | .057 |
| Fe | .77 | .88 |
| Al | .131 | .15 |
| Ca | .001 | .001 |
| $SiO_2$ | .42 | .48 |
| Mn | .019 | .021 |

As can be observed from the above table 1 the feed acid contained about 51 g./l. of sulfate impurities and about 18.5 g./l. fluoride impurities which were extracted from the acid in such amounts as to leave less than 1 g./l. of each impurity or on a percent weight basis .062 for the sulfate impurity and 0.57 for the fluoride impurity which is adequate for most food grade uses with respect to these impurities.

The following table is an analysis of a commercial wet phosphoric acid which had been treated in the same manner as the feed acid in Table 1 to remove fluoride and sulfate impurities and is further purified by extracting the phosphoric acid with an extractant phase of an amine sulfate dissolved in an organic diluent. The feed acid used is of the same analysis as the feed acid in Table 2. In this case a volume of tricaprylyl amine is contacted with a stoichiometric amount of a 96% solution of $H_2SO_4$ to form the amine sulfate which is added to a light petroleum aromatic fraction to form an extractant phase approximately 57% by volume of the amine sulfate to organic diluent. Approximately 300 parts by volume of the extractant phase is contacted in a five stage countercurrent extraction with approximately 70 parts by volume of the acid phase. The extracted phosphoric acid is removed from the extractant phase by water which forms approximately 25% by weight substantially pure phosphoric acid. After concentration by evaporation to about 75% by weight, the phosphoric acid is analyzed with the following results:

TABLE 3

| Constituent: | Percent weight |
|---|---|
| $H_3PO_4$ | 75.0 |
| $SO_4$ | .01 |
| F | .031 |
| Fe | .0113 |
| Al | .0057 |
| Ca | <.001 |
| $SiO_2$ | <.05 |
| Mn | <.01 |

As can be observed from the above table the phosphoric acid is extracted from cation or metallic impurities, such as, iron, aluminum, calcium, manganese, and silicon, to a degree which is adequate for most food grade uses. The feed acid of Table 2 should for comparison purposes be observed with respect to these impurities in order to appreciate the degree of purification of the wet phosphoric acid.

What is claimed is:

1. A method of purifying phophoric acid which comprises contacting said acid containing anionic impurities selected from the group consisting of fluoride impurities, sulfate impurities and mixtures thereof with a water insoluble extractant phase comprised of a compound selected from the group consisting of amines and quaternary ammonium compounds dissolved in an organic diluent, said compound being characterized by containing at least 2 hydrophobic aliphatic substituent groups containing from about 7 to about 15 carbon atoms, said extractant phase being used in an amount sufficient to extract said anionic impurities and form a water-immiscible extractant phase and separating said extractant phase and said acid.

2. A method of purifying wet phosphoric acid containing anionic fluoride impurities and anionic sulfate impurities according to claim 1, wherein said compound is an amine having the formula:

wherein $R_1$ and $R_2$ are members selected from the class consisting of saturated and ethylenically unsaturated aliphatic hydrocarbyl groups containing from about 7 to about 15 carbon atoms and $R_3$ is a member selected from the class consisting of hydrogen and saturated and ethylenically unsaturated aliphatic hydrocarbyl groups containing from 1 to about 18 carbon atoms.

3. A method according to claim 2, wherein said amine is tricaprylyl amine.

4. A method according to claim 2, wherein said amine is tri-n-octylamine.

5. A method according to claim 2, wherein said amine is tri-n-dodecylamine.

6. A method according to claim 2, wherein said amine is tri-iso-octylamine.

7. A method of purifying wet phosphoric acid containing anionic fluoride impurities and anionic sulfate impurities according to claim 1, wherein said compound is an amine salt having the formula:

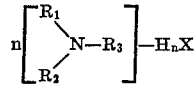

wherein $R_1$ and $R_2$ are members selected from the class consisting of saturated and ethylenically unsaturated aliphatic hydrocarbyl groups containing from about 7 to about 15 carbon atoms, $R_3$ is a member selected from the class consisting of hydrogen, saturated and ethylenically unsaturated aliphatic hydrocarbyl groups containing from 1 to about 18 carbon atoms, $n$ is an integer from 1 to 3 inclusive and X is a member selected from the class consisting of anions of mineral acids having a Ka greater than $8 \times 10^{-3}$.

8. A method according to claim 7, wherein said amine salt is tri-n-octylammonium chloride.

9. A method of purifying wet phosphoric acid containing anionic fluoride impurities and anionic sulfate impurities according to claim 1, wherein said compound is a quaternary ammonium compound having the formula:

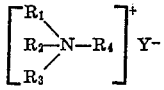

wherein $R_1$ and $R_2$ are members selected from the class consisting of saturated and ethylenically unsaturated aliphatic hydrocarbyl groups containing from about 7 to about 15 carbon atoms, $R_3$ is a member selected from the class consisting of saturated and ethylenically unsaturated and ethylenically unsaturated aliphatic hydrocarbyl groups containing from 1 to about 18 carbon atoms, $R_4$ is a member selected from the class consisting of saturated and ethylenically unsaturated aliphatic hydrocarbyl groups containing from 1 to about 15 carbon atoms and Y is a member selected from the class consisting of anions of mineral acids having a Ka greater than about $8 \times 10^{-3}$.

10. A method according to claim 9, wherein said quaternary ammonium compound is dimethyldidodecyl ammonium chloride.

References Cited

UNITED STATES PATENTS 3,367,749    2/1968    Koerner et al. _____ 23—165 X

OTHER REFERENCES

Coleman et al.: Proceed. Intern. Confer. on Peaceful Uses of Atomic Energy, vol. 28 (1958) pp. 278–80.

Smith et al.: J. Soc. Chem.-Ind. (London), 67 (1948) pp. 48–51.

Wilson et al.: Anal. Chem., vol. 34, No. 2 (1962) pp. 203–207.

OSCAR R. VERTIZ, Primary Examiner

ARTHUR GRIEF, Assistant Examiner

U.S. Cl. X.R.

23—312

PO-1050
(5/69)

UNITED STATES PATENT OFFICE
CERTIFICATE OF CORRECTION

Patent No. 3,458,282　　　　　　　Dated July 29, 1969

Inventor(s) Ernest L. Koerner, Jr. & Elerington Saunders

It is certified that error appears in the above-identified patent and that said Letters Patent are hereby corrected as shown below:

Column 4, line 32, beginning of formula reading "$[[CH_3(SH_2)_7]$" should read -- $[[CH_3(CH_2)_7]$ --.
Column 4, line 51, formula reading "$C_{10}H_{24}$" should read -- $C_{10}H_{21}$ --.
Column 8, table 1, last column, fifth line down under "F" reads ".676" and should read -- .672 --.

SIGNED AND
SEALED
SEP 8 - 1970

(SEAL)
Attest:

Edward M. Fletcher, Jr.
Attesting Officer

WILLIAM E. SCHUYLER, JR.
　　　　　　　　　　　　　　　　　Commissioner of Patents